United States Patent
Chang et al.

(10) Patent No.: US 9,846,657 B2
(45) Date of Patent: Dec. 19, 2017

(54) ELECTRONIC DEVICE FOR PACKING MULTIPLE COMMANDS IN ONE COMPOUND COMMAND FRAME AND ELECTRONIC DEVICE FOR DECODING AND EXECUTING MULTIPLE COMMANDS PACKED IN ONE COMPOUND COMMAND FRAME

(71) Applicant: MEDIATEK INC., Hsin-Chu (TW)

(72) Inventors: Chen-Hao Chang, Taipei (TW); Yao-Chun Su, Hsichu (TW); Shin-Shiun Chen, Taipei (TW); Hong-Ching Chen, Kao-Hsiung (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/934,085

(22) Filed: Nov. 5, 2015

(65) Prior Publication Data

US 2016/0232111 A1 Aug. 11, 2016

Related U.S. Application Data

(60) Provisional application No. 62/112,662, filed on Feb. 6, 2015.

(51) Int. Cl.
*G06F 13/10* (2006.01)
*G06F 13/22* (2006.01)
*G06F 13/40* (2006.01)
*G06F 13/42* (2006.01)

(52) U.S. Cl.
CPC .......... *G06F 13/102* (2013.01); *G06F 13/22* (2013.01); *G06F 13/4068* (2013.01); *G06F 13/4282* (2013.01)

(58) Field of Classification Search
CPC .......... H04L 69/00; H04L 29/06; H04L 69/06; G06F 3/00
See application file for complete search history.

(56) References Cited

U.S. PATENT DOCUMENTS

| | | | |
|---|---|---|---|
| 5,535,418 A * | 7/1996 | Suzuki | G06F 13/24 710/25 |
| 5,822,618 A | 10/1998 | Ecclesine | |
| 6,611,883 B1 * | 8/2003 | Avery | G06F 13/28 709/213 |
| 7,693,138 B2 | 4/2010 | Aloni | |
| 7,742,412 B1 | 6/2010 | Medina | |
| 8,327,039 B2 | 12/2012 | Chou | |
| 8,374,175 B2 | 2/2013 | Riley | |
| 8,701,126 B2 | 4/2014 | van Riel | |
| 8,838,841 B2 * | 9/2014 | Guyot | 710/58 |
| 8,996,781 B2 * | 3/2015 | Schuette | G06F 13/4068 710/301 |
| 2010/0322265 A1 * | 12/2010 | Gopinath | H04L 49/901 370/417 |
| 2011/0320638 A1 * | 12/2011 | Coneski | G06F 13/385 710/5 |

(Continued)

*Primary Examiner* — Farley Abad
(74) *Attorney, Agent, or Firm* — Winston Hsu

(57) ABSTRACT

An electronic device includes a control circuit and a bus interface. The control circuit packs a plurality of commands in a compound command frame. The bus interface communicates with another electronic device via a bus between the electronic device and the another electronic device, and packs the compound command frame in a single packet and transmits the single packet over the bus.

10 Claims, 7 Drawing Sheets

(56) References Cited

U.S. PATENT DOCUMENTS

2014/0068120 A1* 3/2014 Tanaka ................... G06F 13/10
 710/74
2015/0023080 A1* 1/2015 Chambon ........... H02M 1/0845
 363/131

* cited by examiner

ELECTRONIC DEVICE FOR PACKING MULTIPLE COMMANDS IN ONE COMPOUND COMMAND FRAME AND ELECTRONIC DEVICE FOR DECODING AND EXECUTING MULTIPLE COMMANDS PACKED IN ONE COMPOUND COMMAND FRAME

CROSS REFERENCE TO RELATED APPLICATIONS

This application claims the benefit of U.S. provisional application No. 62/112,662, filed on Feb. 6, 2015 and incorporated herein by reference.

BACKGROUND

The present invention relates to command transfer and execution, and more particularly, to an electronic device (e.g., a host) for packing multiple commands in one compound command frame and an electronic device (e.g., a switch) for decoding and executing multiple commands packed in one compound command frame.

A bus is commonly used to allow one electronic device to communicate with another electronic device. For example, a first electronic device may generate commands to a second electronic device for configuring the second electronic device. In a conventional design, a single packet is used to transfer one command over the bus. In other words, one command is regarded as the payload of the single packet. However, besides the payload, the single packet is also required to transfer additional information such as header information. The additional information is the overhead of each packet transfer. In a common case that a length of one command in a packet is smaller than a length of the additional information in the same packet, the command transfer efficiency is quite low due to the fact that the command is only a small portion of the packet.

Thus, there is a need for an innovative command transfer design that is capable of reducing the overhead of each packet transfer between different electronic devices.

SUMMARY

One of the objectives of the claimed invention is to provide an electronic device (e.g., a host) for packing multiple commands in one compound command frame and an electronic device (e.g., a switch) for decoding and executing multiple commands packed in one compound command frame.

According to a first aspect of the present invention, an exemplary electronic device is disclosed. The exemplary electronic device includes a control circuit and a bus interface. The control circuit is arranged to pack a plurality of commands in a compound command frame. The bus interface is arranged to communicate with another electronic device via a bus between the electronic device and another electronic device, wherein the bus interface is further arranged to pack the compound command frame in a single packet and transmit the single packet over the bus.

According to a second aspect of the present invention, an exemplary electronic device is disclosed. The exemplary electronic device includes a bus interface and a control circuit. The bus interface is arranged to communicate with another electronic device via a bus between the electronic device and the another electronic device. The bus interface is further arranged to receive a single packet from the bus, where the single packet comprises a compound command frame having a plurality of commands packed therein. The control circuit is arranged to decode the compound command frame and sequentially execute the commands packed in the compound command frame.

According to a third aspect of the present invention, an exemplary electronic device is disclosed. The exemplary electronic device includes a storage device, a control circuit, and a bus interface. The control circuit is arranged to generate a command frame and perform a polling operation upon the storage device for checking a status associated with execution of the command frame. The bus interface is arranged to communicate with another electronic device via a bus between the electronic device and the another electronic device. The bus interface is further arranged to pack the command frame in a single packet, and transmit the single packet to the another electronic device over the bus.

According to a fourth aspect of the present invention, an exemplary electronic device is disclosed. The exemplary electronic device includes a bus interface and a control circuit. The bus interface is arranged to communicate with another electronic device via a bus between the electronic device and the another electronic device. The bus interface is further arranged to receive a single packet from the bus, where the single packet comprises a command frame. The control circuit is arranged to decode and execute the command frame, and push a status associated with execution of the command frame to a storage device of the another electronic device over the bus.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
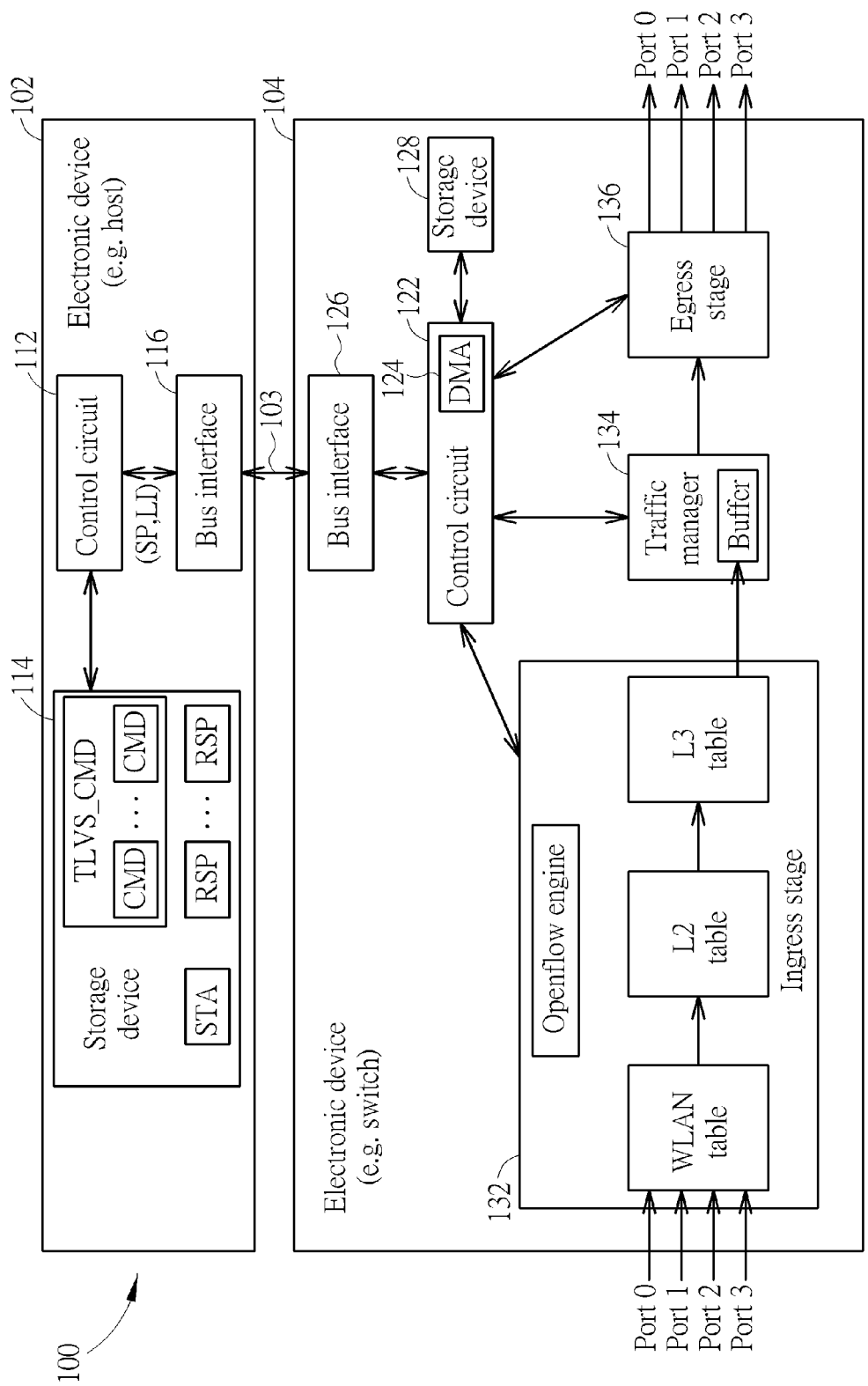
FIG. 1 is a diagram illustrating a computer system according to an embodiment of the present invention.

FIG. 1 is a diagram illustrating a computer system according to an embodiment of the present invention. The computer system 100 includes a plurality of electronic devices such as electronic devices 102 and 104. In this embodiment, the computer system 100 may be a network system, where the electronic device 102 may be a host, and the electronic device 104 may be a switch managed/programmed by the host. As shown in FIG. 1, the electronic device (e.g., host) 102 includes a control circuit (e.g., a central processing unit (CPU)) 112, a storage device (e.g., a dynamic random access memory (DRAM)) 114, and a bus interface 116; and the electronic device (e.g., switch) 104 includes a control circuit (e.g., a micro-processor) 122 with a direct memory access controller (denoted as "DMA") 124, a bus interface 126, a storage device 128, and other switch modules such as an ingress stage 132, a traffic manager 134 and an egress stage 136. Since the present invention focuses on the command transfer and execution and a person skilled in the art should readily understand functions and operations of the switch modules, details of the switch modules are omitted here for brevity. It should be noted that only the components pertinent to the present invention are shown in FIG. 1. In practice, the electronic devices 102 and 104 may include additional components to achieve other functions.

The bus interface 116 of the electronic device 102 is connected to the bus interface 126 of the electronic device 104 via a bus 103 between the electronic devices 102 and 104. Hence, the bus interfaces 116 and 126 allow the electronic devices 102 and 104 to communicate with each other via the bus 103. In this embodiment, the control circuit 112 is arranged to pack a plurality of commands CMD in a compound command frame TLVS_CMD, and store the compound command frame TLVS_CMD into the storage device 114. In addition, the bus interface 116 is arranged to pack the compound command frame TLVS_CMD in a single packet, and transmit the single packet over the bus 103, and the bus interface 126 is arranged to receive the single packet (which includes the compound command frame TLVS_CMD) from the bus 103. In this embodiment, the bus 103 may be a Peripheral Component Interconnect Express (PCIe) bus, and the compound command frame TLVS_CMD may be payload of a single PCIe packet.

The PCIe packet may employ an exemplary packet structure as follows.

| Type | Size (unit: Byte) |
|---|---|
| Start of Packet (STP) | 1 |
| Sequence Number (SN) | 2 |
| Header | 12 |
| Payload | X |
| End to End Cyclic Redundancy Check (ECRC) | 4 |
| Link Layer CRC (LCRC) | 4 |
| END | 1 |

In this embodiment, the control circuit 112 is arranged to pack a plurality of commands CMD in a compound command frame TLVS_CMD, and store the compound command frame TLVS_CMD into the storage device 114. Hence, the payload size X depends on the number of commands CMD packed in the same compound command frame TLVS_CMD. Since more than one command CMD is transmitted by a single PCIe packet, the command transfer efficiency can be improved greatly by a longer burst in the PCIe transaction.

Figure 2:
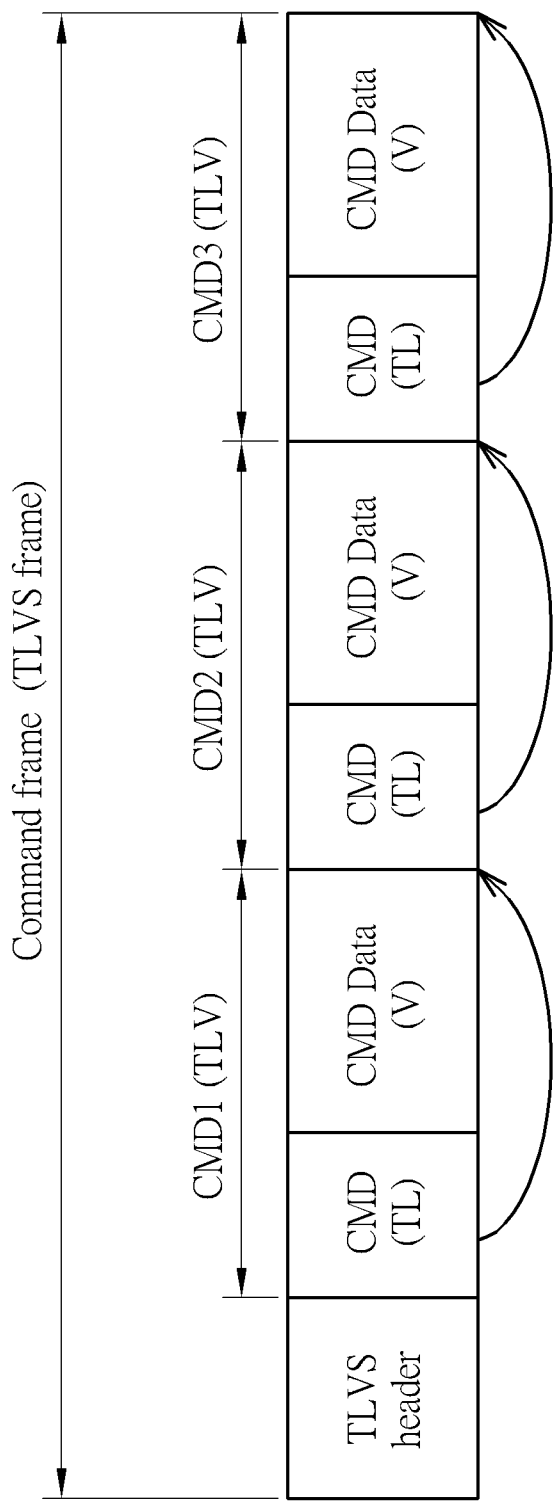
FIG. 2 is a diagram illustrating a structure of a compound command frame according to an embodiment of the present invention.

FIG. 2 is a diagram illustrating a structure of a compound command frame according to an embodiment of the present invention. In this embodiment, a TLVS frame structure is employed, where "T" represents the command type, "L" represents the command length, "V" represents the command value, and "S" represents multiple commands. One compound command frame (TLVS frame) begins with a TLVS header, where the TLVS header is followed by a plurality of commands each having a TLV command format. In this example, there are three commands CMD1, CMD2 and CMD3 packed in the same compound command frame. The TLV command format of one command includes at least a type and length field (denoted by CMD (TL)), and may optionally include a command value (denoted by CMD (V)) depending upon the actual design of the command. In other words, each of the commands CMD packed in the same compound command frame TLVS_CMD must have one type and length field that records the command type and the command length.

In a case where the command has an accompanying command value, the command length of the command is equal to a length of the type and length field plus a length of a value field. In another case where the command has no accompanying command value, the command length of the command is equal to the length of the type and length field. The command length recorded in the type and length field of a current command can be used to identify a start address of a next command. The TLVS header may record information of the number of commands packed in the same compound command frame, information of sequence number (SN) values of commands packed in the same compound command frame, etc. The end of the compound command frame can be identified by checking a length of the compound command frame that may be indicated by a length indicator.

After the control circuit 112 generates and stores the compound command frame TLVS_CMD (which has more than one command packed therein), the control circuit 112 sends an address pointer SP indicative of a location of the compound command frame TLVS_CMD in the storage device 114 and a length indicator LI indicative of a length of the compound command frame TLVS_CMD to the electronic device 104. The address pointer SP and the length indicator LI may be transferred from the bus interface 116 of the electronic device 102 to the bus interface 126 of the electronic device 104 by using at least one packet transmitted over the bus 103. In this embodiment, the control circuit 122 is equipped with the DMA controller 124 to support remote DMA access of the storage device 114. For example, after the control circuit 122 receives the address pointer SP and the length indicator LI from the bus interface 126, the DMA controller 124 is operative to fetch the compound command frame TLVS_CMD from the storage device 114 according to the received address pointer SP and length indicator LI. For example, the DMA controller 124 can store the retrieved compound command frame TLVS_CMD in the storage device (e.g., switch memory) 128 of the electronic device 104, such that the control circuit 122 can execute commands fetched from the storage device (e.g., switch memory) 128 of the electronic device 104. To put it another way, a zero copy (ZC) mode is enabled due to remote DMA access of the storage device 114. In this way, the compound command frame TLVS_CMD can be read from the storage device 114 and transmitted over the bus 103 without intervention of the control circuit 112.

Next, the control circuit 122 decodes the fetched compound command frame TLVS_CMD, and sequentially executes the multiple commands CMD packed in the fetched compound command frame TLVS_CMD. For example, each of the commands CMD is executed to access a table or a register in the electronic device 104. As mentioned above, the control circuit 122 can refer to the command length recorded in the type and length field of a current command to identify a start address of a next command. Hence, the control circuit 122 sequentially executes commands CMD in the compound command frame TLVS_CMD until the last command CMD in the compound command frame TLVS_CMD is executed.

Figure 3:
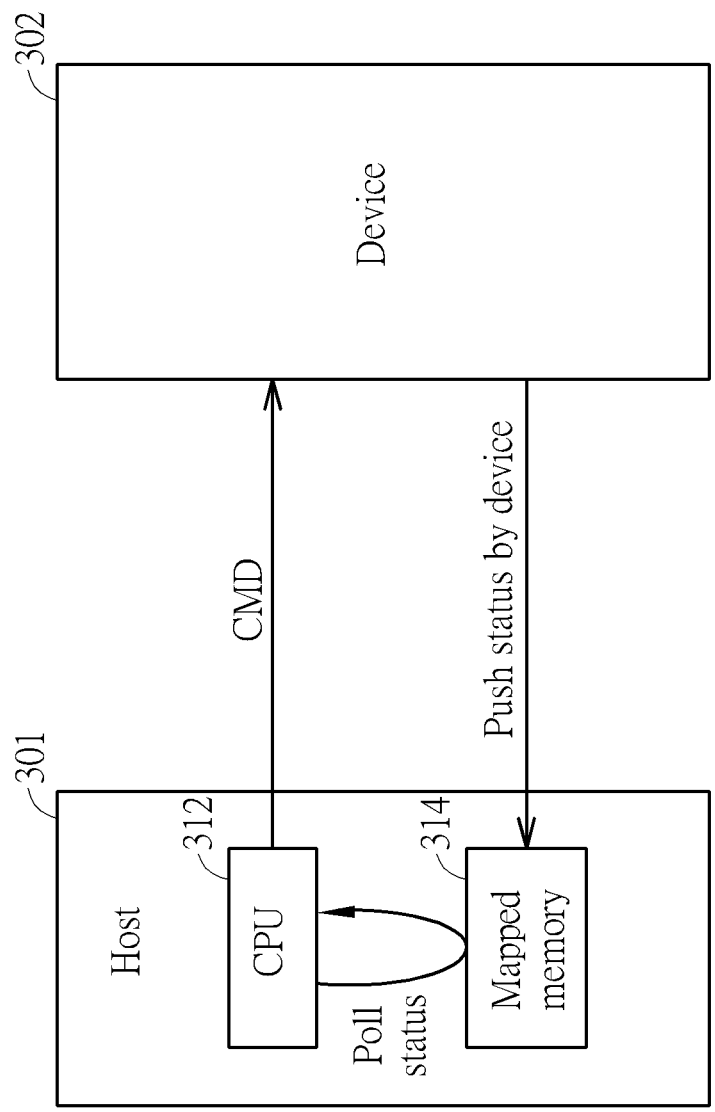
FIG. 3 is a diagram illustrating an example of a "Push-to-Host" polling method.

If the control circuit 112 (which issues commands CMD) performs a polling operation upon the control circuit 122 (which executes the issued commands CMD), the polling operation will consume a lot of the bandwidth of the bus 103 between the electronic devices 102 and 104. To reduce the bus bandwidth consumption caused by the polling operation, the computer system 100 may be configured to employ a "Push-to-Host" polling method. FIG. 3 is a diagram illustrating an example of a "Push-to-Host" polling method. A CPU 312 of a host 301 generates a command CMD to a device 302, and then polls a mapped memory 314 to check a response status of the command CMD. The device 302 executes the command CMD, and pushes the response status of the command CMD to the mapped memory 314. As can be seen from FIG. 3, the CPU 312 performs the polling operation inside the host 301. In this way, the polling operation performed by the CPU 312 does not consume the bus bandwidth between the host 301 and the device 302.

In this embodiment, the control circuit 112 is arranged to perform a polling operation upon the storage device 114 for checking a status associated with execution of the compound command frame TLVS_CMD (e.g., an execution status STA of the compound command frame TLVS_CMD and/or a response status RSP of each command CMD in the compound command frame TLVS_CMD), and the control circuit 122 is arranged to push the status associated with execution of the compound command frame TLVS_CMD (e.g., the execution status STA of the compound command frame TLVS_CMD and/or the response status RSP of each command CMD in the compound command frame TLVS_CMD) to the storage device 114. For example, when one command CMD packed in the compound command frame TLVS_CMD is executed by the control circuit 122, the control circuit 122 pushes a response status RSP of the command CMD to the storage device 114. The response status RSP of the command CMD may indicate a status of the electronic device 104. For another example, after the last command CMD packed in the compound command frame TLVS_CMD is executed by the control circuit 122, the control circuit 122 pushes an execution status STA of the compound command frame TLVS_CMD to the storage device 114. The execution status STA of the compound command frame TLVS_CMD may indicate whether all of the commands CMD in the same compound command frame TLVS_CMD are successfully executed without errors. When at least one response status RSP is updated in the storage device 114 and the execution status STA is not updated in the storage device 114 yet, the control circuit 112 can obtain the at least one response status RSP by polling the storage device 114. Similarly, after all response statuses RSP and the execution status STA are updated in the storage device 114, the control circuit 112 can obtain all response statuses RSP and the execution status STA by polling the storage device 114.

Figure 4:
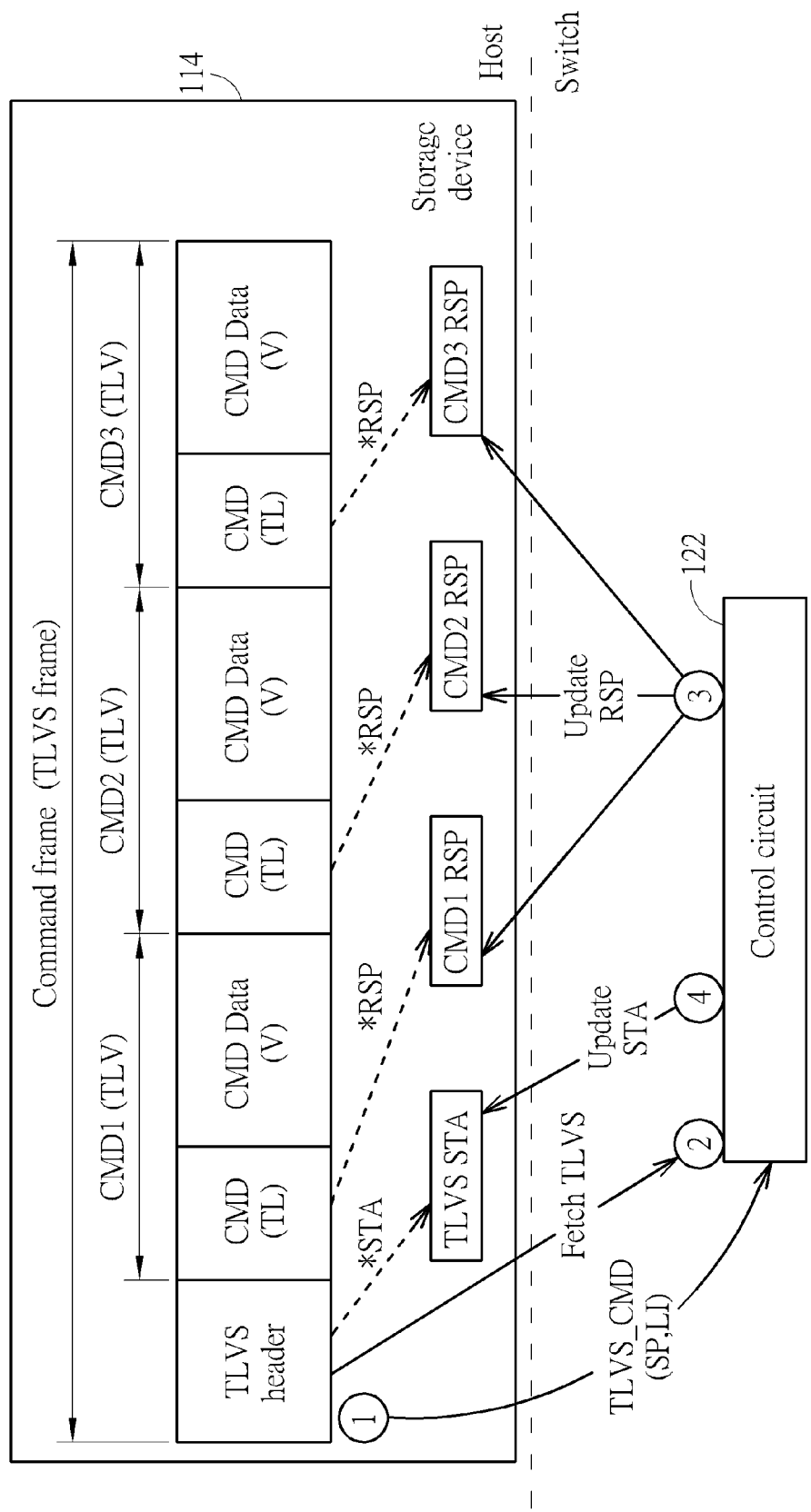
FIG. 4 is a diagram illustrating operations of fetching a compound command frame, executing commands packed in the compound command frame and updating response statuses and execution status according to an embodiment of the present invention.

FIG. 4 is a diagram illustrating operations of fetching a compound command frame, executing commands packed in the compound command frame and updating response statuses and execution status according to an embodiment of the present invention. The compound command frame TLVS_CMD is stored in the storage device (e.g., host memory) 114. In the first phase, an address pointer SP and a length indicator LI of the compound command frame TLVS_CMD is sent from the control circuit (e.g., host CPU) 112 to the control circuit (e.g., switch's micro-processor) 122. In the second phase, the control circuit (e.g., switch's micro-processor) 122 refers to the received address pointer SP and length indicator LI to fetch the compound command frame TLVS_CMD from the storage device (e.g., host memory) 114 and then store the whole fetched compound command frame TLVS_CMD in the storage device (e.g., switch memory) 128, and then sequentially execute commands in the compound command frame TLVS_CMD. In the third phase, when execution of one of commands packed in the compound command frame TLVS_CMD is finished, the control circuit 122 updates a corresponding response status RSP to a location (e.g., a memory address in host memory) pointed to by an address pointer *RSP. In the fourth phase, after execution of the last command in the compound command frame TLVS_CMD is finished, the control circuit 122 updates a corresponding execution status STA to a location (e.g., a memory address in host memory) pointed to by an address pointer *STA. For example, settings of address pointers *RSP and *STA may be configured by the control circuit (e.g., host CPU) 112 and may be carried by the compound command frame TLVS_CMD.

Figure 5:
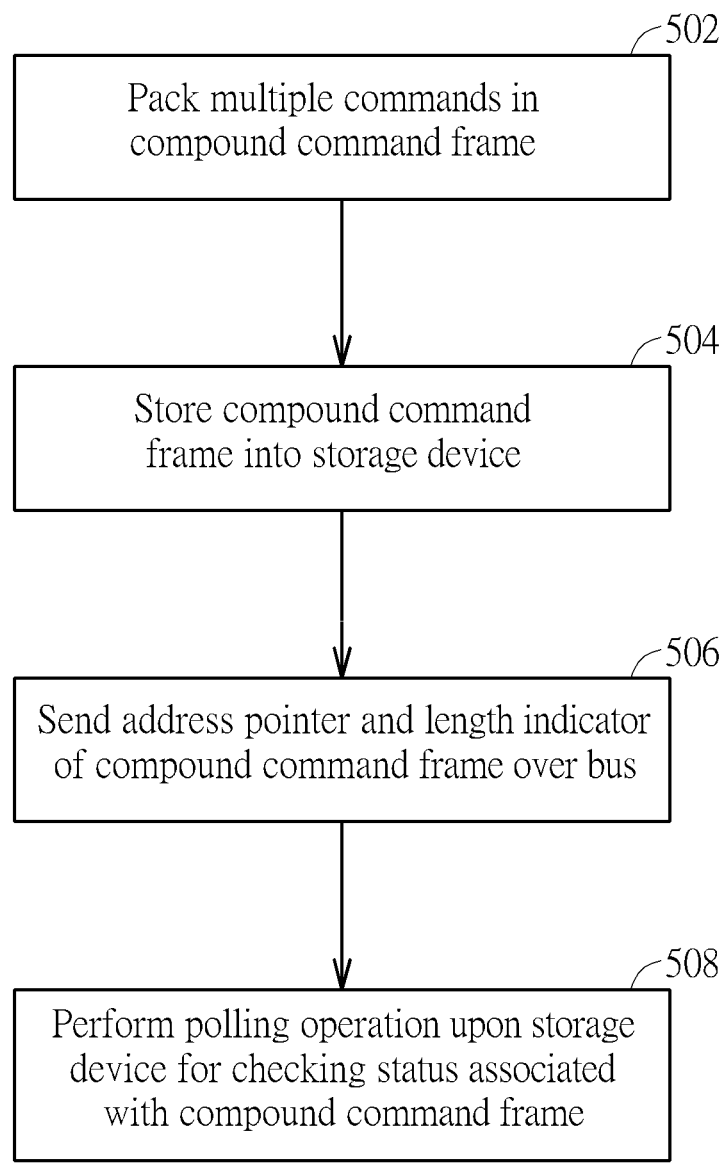
FIG. 5 is a flowchart illustrating a compound command processing operation at one electronic device according to an embodiment of the present invention.

FIG. 5 is a flowchart illustrating a compound command processing operation at one electronic device (e.g., host) according to an embodiment of the present invention. Provided that the result is substantially the same, the steps are not required to be executed in the exact order shown in FIG. 5. The compound command processing operation at one electronic device (e.g., host) may be performed by the control circuit 112 shown in FIG. 1, and may be briefly summarized as below.

Step 502: Pack a plurality of commands in a compound command frame.

Step 504: Store the compound command frame into a storage device (e.g., host memory).

Step 506: Send an address pointer and a length indicator of the compound command frame over a bus.

Step 508: Perform a polling operation upon the storage device (e.g., host memory) for checking a status associated with execution of the compound command frame (e.g., execution status of the compound command frame and/or response status of each command in the compound command frame).

Since a person skilled in the pertinent art can readily understand details of the steps shown in FIG. 5 after reading above paragraphs, further description is omitted here for brevity.

Figure 6:
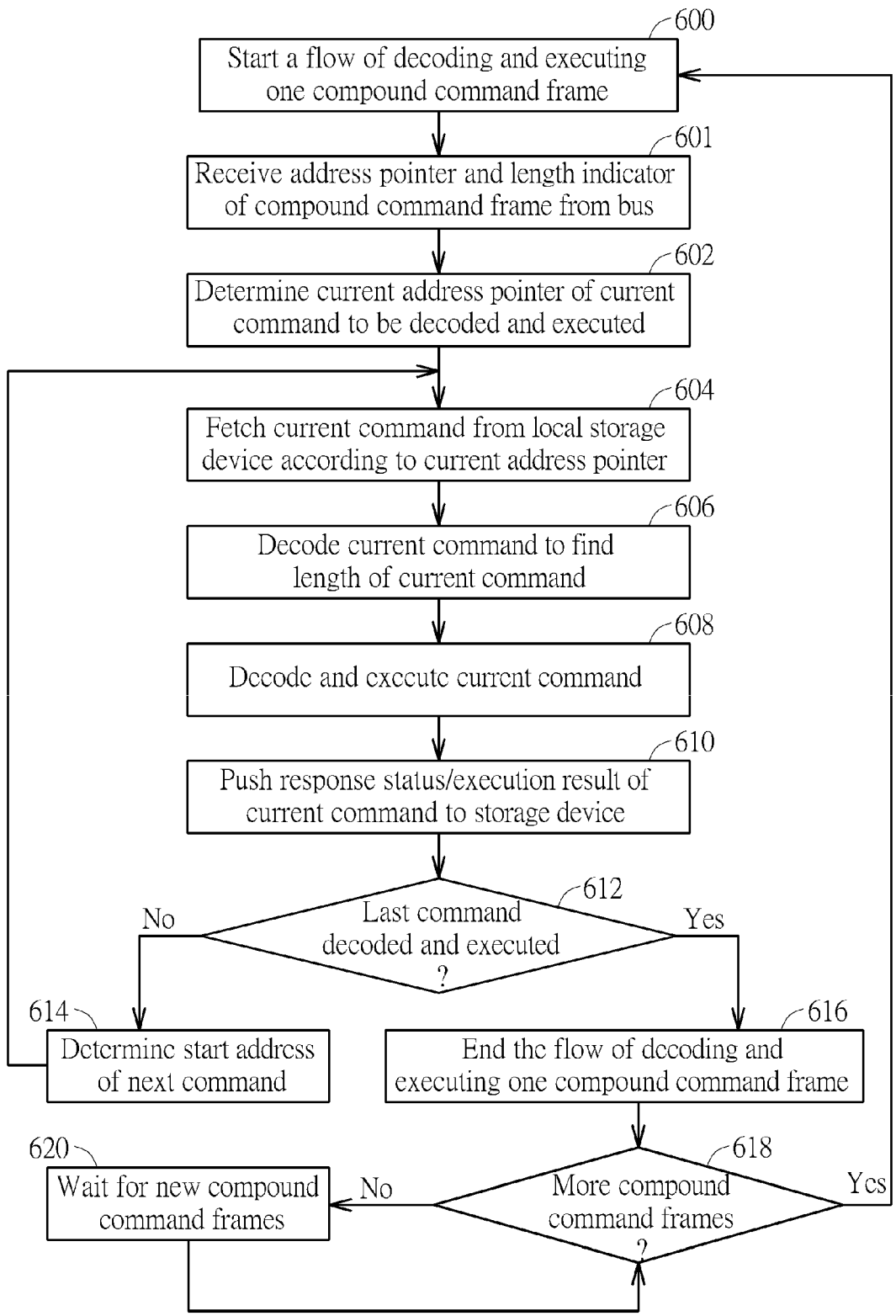
FIG. 6 is a flowchart illustrating a compound command processing operation at the other electronic device according to an embodiment of the present invention.

FIG. 6 is a flowchart illustrating a compound command processing operation at the other electronic device (e.g., switch) according to an embodiment of the present invention. Provided that the result is substantially the same, the steps are not required to be executed in the exact order shown in FIG. 6. The compound command processing operation the other electronic device (e.g., switch) may be performed by the control circuit 122 shown in FIG. 1, and may be briefly summarized as below.

Step 600: Start a flow of decoding and executing one compound command frame having multiple commands packed therein.

Step 601: Receive an address pointer and a length indicator of the compound command frame from a bus. For example, the address pointer and the length indicator can be referenced to fetch the compound command frame from a remote storage device (e.g., host memory) in a DMA manner, such that the whole compound command frame can be available in a local storage device (e.g., switch memory).

Step 602: Determine a current address pointer of a current command to be decoded and executed. Since the address pointer pointing to a start address of the compound command frame and a pre-determined length of the TLVS header are known, the current address pointer pointing to a start address of the first command can be determined.

Step 604: Fetch the current command in the compound command frame from a local storage device (e.g., switch memory) according to the current address pointer of the current command.

Step 606: Decode the current command to find a length of the current command.

Step 608: Decode and execute the current command.

Step 610: Push a response status/execution result of the current command to the storage device (e.g., host memory).

Step 612: Check if the last command in the compound command frame is decoded and executed. If yes, go to step 616; otherwise, go to step 614.

Step 614: Determine a start address of the next command packed in the compound command frame. For example, current address pointer=current address pointer+current command's length. Go to step 604.

Step 616: End the flow of decoding and executing one compound command frame.

Step 618: Check if the storage device (e.g., host memory) still has compound command frame(s) to be processed. If yes, go to step 600; otherwise, go to step 620.

Step 620: Wait for new compound command frames. Go to step 618.

When there is any unprocessed compound command frame available in the storage device (e.g., host memory), the unprocessed compound command frame is fetched from the storage device (e.g., host memory) and then executed (steps 618 and 620). It should be noted that the execution order of steps 606 and 608 in FIG. 6 is for illustrative purposes only. Alternatively, steps 606 and 608 may be swapped such that step 608 is executed before step 606. Since a person skilled in the pertinent art can readily understand details of the steps shown in FIG. 6 after reading above paragraphs, further description is omitted here for brevity.

In some embodiments, the whole compound command frame is fetched in only one packet transfer and then stored into a local memory of the electronic device (e.g., switch memory), thus reducing the consumed bandwidth for frequently accessing a remote memory of another electronic device (e.g., host memory). By this way, the commands packed in the same compound packet frame can be fetched from the local memory of the electronic device (e.g., switch memory) one by one according to respective address pointers of the commands.

Figure 7:
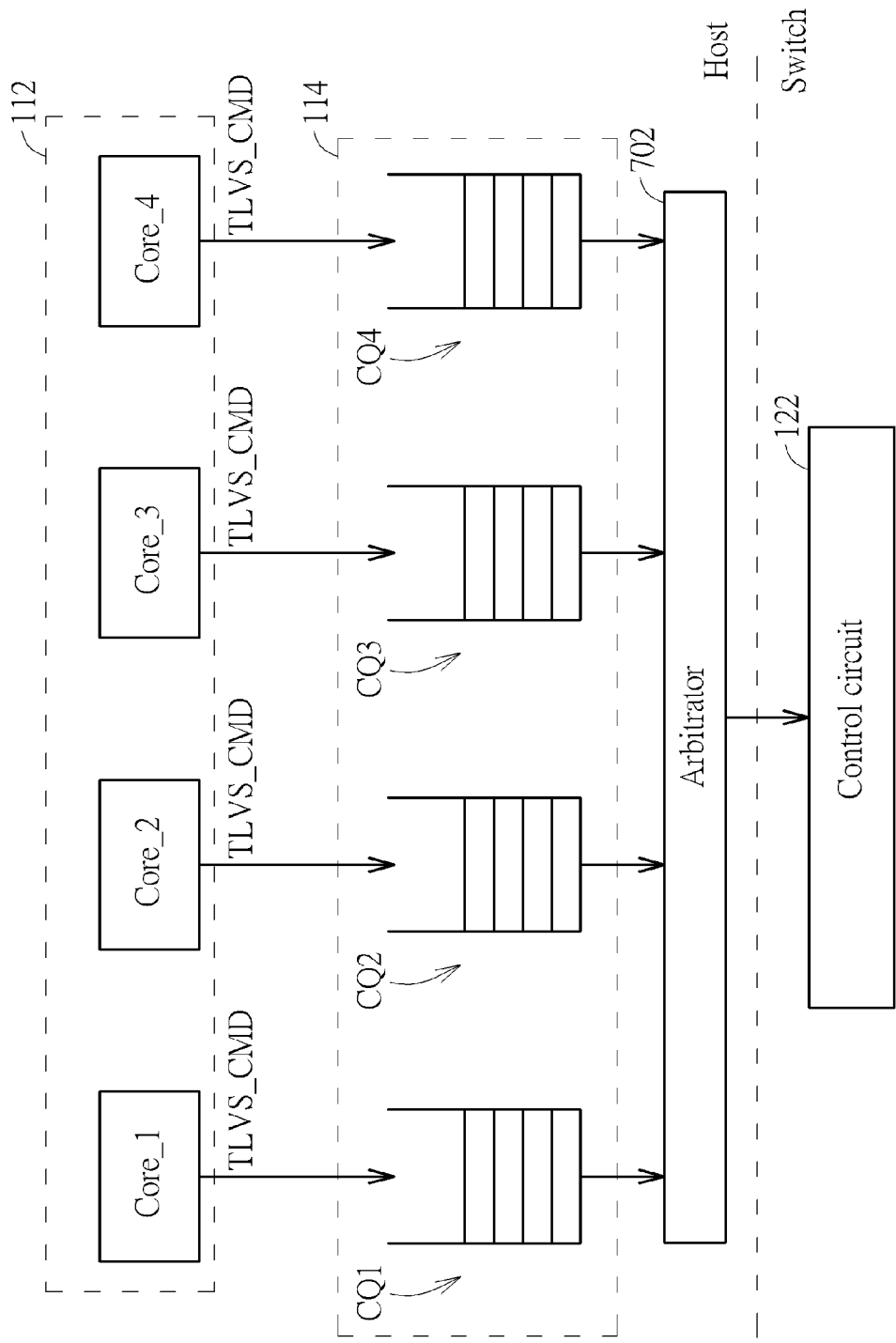
FIG. 7 is a diagram illustrating an exemplary arrangement of a storage device under a condition that a control circuit at one electronic device is a multi-core processor.

In one exemplary design, the control circuit 112 may be implemented using a single-core processor. Hence, the storage device 114 may be configured to have a single command queue allocated for the single-core processor, such that each compound command frame TLVS_CMD generated from the single-core processor is stored into the single command queue. In another exemplary design, the control circuit 112 may be implemented using a multi-core processor. FIG. 7 is a diagram illustrating an exemplary arrangement of the storage device 114 under a condition that the control circuit 112 is a multi-core processor. By way of example, but not limitation, the control circuit 112 may be a quad-core processor having four processor cores Core_1-Core_4. The storage device 114 is therefore configured to have four command queues CQ1-CQ4 allocated for the processor cores Core_1-Core_4, respectively. Hence, the processor core Core_1 generates compound command frames TLVS_CMD to the command queue CQ1; the processor core Core_2 generates compound command frames TLVS_CMD to the command queue CQ2; the processor core Core_3 generates compound command frames TLVS_CMD to the command queue CQ3; and the processor core Core_4 generates compound command frames TLVS_CMD to the command queue CQ4. Because the command queues CQ-CQ4 are allocated in the storage device 112 of the electronic device 102 (e.g., host's dynamic random access memory (DRAM)) instead of a storage device of the electronic device 104 (e.g., device's statistic random access memory (SRAM)), the command queue size is not restricted by device's SRAM and is flexibly determined by host's CPU. Further, the remote DMA function of the control circuit 122 (e.g., device's micro-processor) can get one compound command frame TLVS_CMD from one of the command queues CQ1-CQ4 in the storage device 114 through an arbitrator 702.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device comprising:
   a storage device, arranged to store a compound command frame;
   a control circuit, arranged to pack a plurality of commands in a compound command frame; and send an address pointer indicative of a location of the compound command frame in the storage device and a length indicator indicative of a length of the compound command frame to another electronic device, wherein each of the commands packed in the compound command frame comprises at least a type and length field that is arranged to indicate a type of the command and a length of the command; and
   a bus interface, arranged to communicate with the another electronic device via a bus between the electronic device and the another electronic device, wherein the bus interface is further arranged to pack the compound command frame in a single packet and transmit the single packet over the bus; and the compound command frame is read from the storage device and transmitted over the bus without intervention of the control circuit;
   wherein the control circuit is further arranged to perform a polling operation upon the storage device for checking an execution status of all commands within the compound command frame.

2. The electronic device of claim 1, wherein the control circuit is a multi-core processor having a plurality of processor cores, the storage device has a plurality of command queues allocated for the processor cores respectively, and the compound command frame generated from a processor core is stored into a corresponding command queue.

3. The electronic device of claim 1, wherein the electronic device is a host, and the another electronic device is a switch.

4. The electronic device of claim 1, wherein the bus is a Peripheral Component Interconnect Express (PCIe) bus.

5. An electronic device comprising:
a bus interface, arranged to communicate with another electronic device via a bus between the electronic device and the another electronic device, wherein the bus interface is further arranged to receive a single packet from the bus, where the single packet comprises a compound command frame having a plurality of commands packed therein, wherein each of the commands packed in the compound command frame comprises at least a type and length field that is arranged to indicate a type of the command and a length of the command; and
a control circuit, arranged to decode the compound command frame, receive an address pointer indicative of a location of the compound command frame in a storage device and a length indicator indicative of a length of the compound command frame from the another electronic device, and sequentially execute the commands packed in the compound command frame, comprising:
a direct memory access (DMA) controller arranged to fetch the compound command frame from the storage device of the another electronic device through the bus interface according to the address pointer indicative and the length indicator;
wherein the control circuit is further arranged to push an execution status of all commands within the compound command frame to the storage device of the another electronic device over the bus.

6. The electronic device of claim 5, wherein the storage device has a plurality of command queues allocated for a plurality of processor cores respectively, and the control circuit fetches the compound command frame from one of the command queues.

7. The electronic device of claim 5, wherein the electronic device is a switch, and the another electronic device is a host.

8. The electronic device of claim 5, wherein the bus is a Peripheral Component Interconnect Express (PCIe) bus.

9. An electronic device comprising:
a storage device;
a control circuit, arranged to pack a plurality of commands in a compound command frame, wherein each of the commands packed in the compound command frame comprises at least a type and length field that is arranged to indicate a type of the command and a length of the command; and
a bus interface, arranged to communicate with another electronic device via a bus between the electronic device and the another electronic device, wherein the bus interface is further arranged to pack the compound command frame in a single packet and transmit the single packet over the bus;
wherein the control circuit is arranged to perform a polling operation upon the storage device for checking a response status of each of all the commands within the compound command frame; and is further arranged to perform the polling operation upon the storage device for checking an execution status of all commands within the compound command frame; the execution status is updated at least after all the commands are executed.

10. An electronic device comprising:
a bus interface, arranged to communicate with another electronic device via a bus between the electronic device and the another electronic device, wherein the bus interface is further arranged to receive a single packet from the bus, where the single packet comprises a compound command frame having a plurality of commands packed therein, wherein each of the commands packed in the compound command frame comprises at least a type and length field that is arranged to indicate a type of the command and a length of the command; and
a control circuit, arranged to decode the compound command frame and sequentially execute the commands packed in the compound command frame;
wherein the control circuit is further arranged to push a response status of each of all the commands within the compound command frame to a storage device of the another device; and is further arranged to push an execution status of all commands within the compound command frame to the storage device of the another device over the bus; the execution status is updated at least after all of the commands are executed.

* * * * *

UNITED STATES PATENT AND TRADEMARK OFFICE
CERTIFICATE OF CORRECTION

PATENT NO. : 9,846,657 B2
APPLICATION NO. : 14/934085
DATED : December 19, 2017
INVENTOR(S) : Chen-Hao Chang et al.

Page 1 of 1

It is certified that error appears in the above-identified patent and that said Letters Patent is hereby corrected as shown below:

On the Title Page

Item (72), correct the city of the second inventor from "Hsichu" to --Hsinchu--.

Signed and Sealed this
Twelfth Day of June, 2018

Andrei Iancu
*Director of the United States Patent and Trademark Office*